Figure 2:
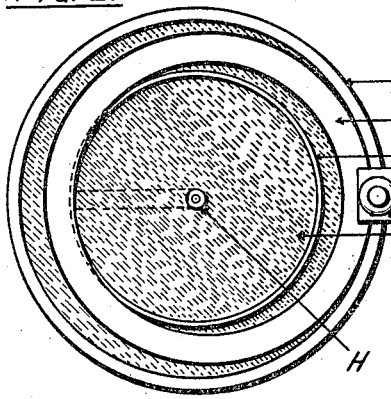

W. C. BAUER.
ELECTRIC BATTERY.
APPLICATION FILED APR. 3, 1914.

1,289,609.

Patented Dec. 31, 1918.

WITNESSES.
H. S. Philbrick
Wm H. Burger

INVENTOR.
William Chas. Bauer

UNITED STATES PATENT OFFICE.

WILLIAM CHARLES BAUER, OF EVANSTON, ILLINOIS.

ELECTRIC BATTERY.

1,289,609.

Specification of Letters Patent. Patented Dec. 31, 1918.

Application filed April 3, 1914. Serial No. 829,275.

*To all whom it may concern:*

Be it known that I, WILLIAM CHAS. BAUER, a citizen of the United States, and resident of Evanston, in the county of Cook and State of Illinois, have invented a certain new and useful Improvement in Electric Batteries, of which the following is a full, clear, and exact specification.

This invention relates to a new caustic alkali battery and has for its object the simultaneous employment of a fixed alkali such as sodium, potassium or lithium hydroxid or a suitable mixture of them, as the electrolyte and red lead or minium as the depolarizing agent immersed in the alkali electrolyte.

To employ such a combination with the highest efficiency this invention further provides suitable physical and chemical means to prevent local action upon the zinc element, by preventing as far as possible solution of the said oxid and the impurities usually found therewith in the alkali electrolyte and by freeing the electrolyte of any soluble lead compounds which may be formed by such solvent action of the alkali.

When a metallic compound is used as a depolarizer it is essential that the same be practically insoluble in the electrolyte employed therewith. If it is soluble to any appreciable extent local action results with the zinc or positive element since the latter will displace from solution the metallic ion formed by the soluble depolarizer.

Red lead, or minium as it is also called, I have found to be the most available of all of the oxids of lead for use in an alkaline hydroxid electrolyte because of its slight solubility therein, which is shown by the fact that when a proper solution of litharge PbO in alkali is added to a proper solution of lead dioxid $PbO_2$ in alkali, a red precipitate of red lead having approximately the formula $Pb_3O_4$ is formed.

To prepare red lead as above is expensive and I therefore prefer to use the red lead as commercially manufactured. Since this usually contains a small amount of litharge which is very soluble in the alkali means are utilized to restrict this solubility.

When the electrolyte contains lead in solution in too large an amount not only does the wasteful action on the zinc result, but, since the lead is displaced from the solution as a very voluminous spongy mass, internal short circuits often result when the lead bridges the space between the elements of the cell. I therefore prevent such action as far as possible by certain physical means hereinafter described and by chemical means as by adding to the alkali, to the depolarizer, or to both, a substance which will precipitate the soluble lead from an alkali solution. Such a precipitant I shall term an "alkali lead precipitant".

Among the few precipitants of lead which are effective in alkali lead solutions I prefer the soluble sulfids and soluble hypochlorites, but I do not intend to limit myself to them. When using a sulfid I prefer sodium, potassium or ammonium sulfid, and when using a hypochlorite I prefer sodium or calcium hypochlorite (bleaching powder). The precipitated lead compound, which is either the sesquioxid $Pb_2O_3$ or sometimes an oxychlorid when the hypochlorite is used, also serves as a depolarizer in conjunction with the red lead and no waste of the depolarizer takes place.

The red lead oxids can be employed in a loose granular state or in the form of a compressed cake of any suitable shape. The compressed cake is less soluble in the alkali electrolyte and in some forms of my cell the use of very high compression reduces the solubility to such an extent that the local action upon the zinc is not serious, even when the precipitant is omitted.

As stated above, when the depolarizer contains the soluble lead oxids in too large an amount, the soluble action of the alkali hydroxid can be further suppressed, whenever that is desirable, by employing a suitable precipitant. When the depolarizer is used in the form of a compressed cake it may be dipped in a proper solution of the precipitant. The cake thus becomes covered with a protective covering or layer of an insoluble lead compound, which is formed either before or after immersion in the alkali depending upon the exact nature of the precipitant used. It is clear that the protective covering need not be an insoluble lead compound, it may be any other inactive or inert material. Whatever the protective covering the same object is attained.

While it is clear that my discovery of the suitability of red lead as a depolarizer in combination with an alkali hydroxid electrolyte is not limited to any particular details of battery construction, nevertheless, to illustrate the application of my invention to a simple type of cell, I will refer to the accompanying drawings which form a part of this specification.

Figure 4:
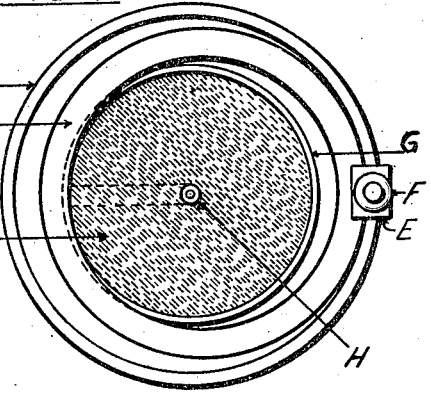
Figure 1:
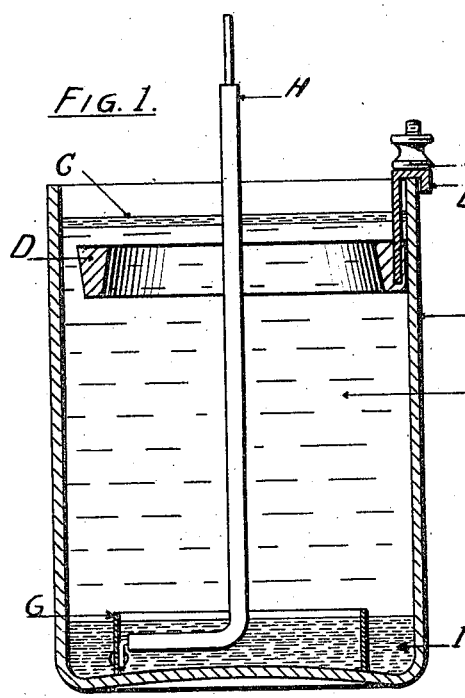
Figure 3:
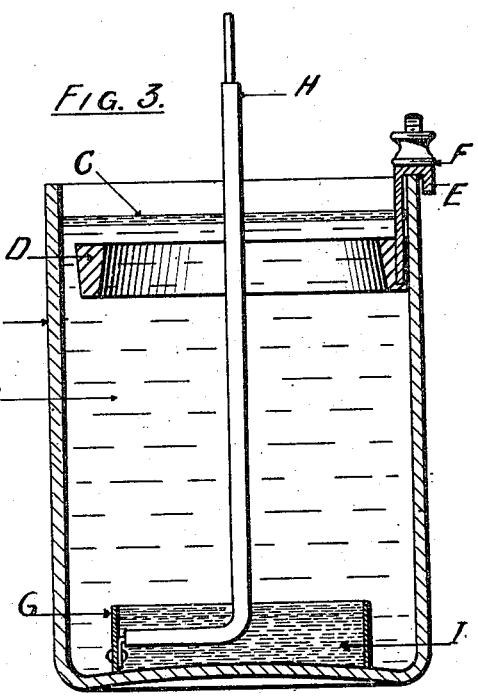

In all of the figures like parts are indicated with the same reference marks. Figure 1 and Fig. 3 are diametrical elevational sectional views of a gravity type of battery, and Figs. 2 and 4 are plan views of Figs. 1 and 3 respectively.

In the various figures, A is a suitable battery jar containing the caustic alkali electrolyte B. C is a layer of oil to seal the electrolyte A from the air. D is the electropositive zinc element which is shown suspended in the electrolyte B from the rim of the jar A by means of the hooked conducting rod E. The latter is provided with the terminal F. G is the insoluble electronegative element which is shown as a metal ring in contact with the depolarizer I. Both G and I are shown supported upon the bottom of the jar A.

In Fig. 1 the red lead depolarizer I is shown as a loose powder spread over the bottom of the jar A with the negative element G embedded therein. In Fig. 3 it is shown as a compressed porous cake resting upon the bottom of the jar A and bound by the peripheral metal ring G. While I have shown that the depolarizer may be employed either in the form of a loose powder or a compressed cake, my preference is to use it in the latter form.

Attention may be called to another feature of my cell. When it is in operation, the red color of the red lead is changed to a dull gray color, namely that of the resulting lead. If the jar A is of transparent glass the condition of the cell may be observed by noting this color change. When all of the red color has disappeared the cell is depleted.

It is not my intention to limit myself to the exact details as herein described. It is clear that such may be varied without departing materially from the general results.

Having now described my invention and a practical application thereof, what I claim as new and desire to protect by Letters Patent in the United States is as follows:—

1. In a primary electric battery, in combination, a positive zinc element, a suitable negative element, an alkaline hydroxid electrolyte, and red lead for the depolarizer.

2. In a primary electric battery, red lead as the depolarizer, combined with an alkaline hydroxid in solution as the electrolyte, a negative element to coöperate with said depolarizer and zinc as the positive element.

3. In an electric battery in combination, suitable electrodes, an electrolyte containing a fixed alkali, a lead oxygen compound as a depolarizer and an "alkali lead precipitant" for the purpose as herein set forth.

4. In an electric battery in combination, suitable electrodes, an electrolyte containing a fixed alkali, a lead oxygen compound as a depolarizer and means as herein set forth to prevent the excessive solubility of the said lead compound in the said electrolyte.

5. In an electric battery, the combination of an alkaline hydroxid electrolyte, a zinc anode, a cathode comprising an oxid of lead, and an alkali lead precipitant.

6. In an electric battery, the combination of an alkaline hydroxid electrolyte, a zinc anode, a cathode comprising an oxid of lead, and a chemical to precipitate from the said electrolyte the soluble lead compounds which may form in the said electrolyte.

7. In an electric battery in combination, an alkaline hydroxid electrolyte, a depolarizer comprising an oxygen compound of lead and compressed into a solid porous mass, a negative element coöperating with the said depolarizer, a positive zinc element, and external terminals for said elements.

8. In an electric battery in combination, an alkaline hydroxid electrolyte, a depolarizer comprising an oxygen compound of lead and compressed into a solid mass, and the said mass covered with a lead compound which is practically insoluble in the said electrolyte, as and for the purpose herein set forth.

9. In an electric battery in combination, an electrolyte containing an alkaline hydroxid and a soluble sulfid, suitable electrodes, and a depolarizer consisting of an oxid of lead.

10. In an electric battery in combination, an alkaline hydroxid as the electrolyte, immersed therein red lead or minium as the depolarizer, the said depolarizer suitably compressed, a negative element to coöperate with said depolarizer, a positive zinc element and external terminals for said elements.

11. In an electric battery in combination, an alkaline hydroxid electrolyte, suitable electrodes, an oxid of lead depolarizer, and a hypochlorite.

WILLIAM CHARLES BAUER.

Witnesses:
   Joseph Pearson,
   Clyde D. Foster.